US006446506B1

(12) United States Patent
VanZuilen

(10) Patent No.: US 6,446,506 B1
(45) Date of Patent: Sep. 10, 2002

(54) FLUID LEVEL SENSING SWITCH

(75) Inventor: David M. VanZuilen, Fremont, IN (US)

(73) Assignee: Siemens VDO Automotive Corporation, Auburn Hills, MI (US)

(*) Notice: Subject to any disclaimer, the term of this patent is extended or adjusted under 35 U.S.C. 154(b) by 164 days.

(21) Appl. No.: 09/618,688

(22) Filed: Jul. 18, 2000

(51) Int. Cl.[7] .......................... G01F 23/32; G01F 23/36

(52) U.S. Cl. ...................... 73/308; 73/322.005; 73/305; 200/80 R; 200/84 C

(58) Field of Search ............................... 73/305, 322.5; 200/80 R, 84 C, 230; 4/325; 340/425.5, 450, 624, 618, 625

(56) References Cited

U.S. PATENT DOCUMENTS

| | | | | |
|---|---|---|---|---|
| 4,600,820 A | | 7/1986 | Bruder et al. | 200/84 |
| 4,848,151 A | | 7/1989 | Bruder et al. | 73/308 |
| 5,042,300 A | * | 8/1991 | Benjey et al. | 73/308 |
| 6,089,086 A | * | 7/2000 | Swindler et al. | 73/317 |

* cited by examiner

*Primary Examiner*—Hezron Williams
*Assistant Examiner*—Andre' K. Jackson

(57) ABSTRACT

The present invention provides a fluid level sensing switch for use with a device having a fluid reservoir. The switch is float activated and closes a circuit so as to change an operating parameter in the event that the volume of fluid in the reservoir falls below a predetermined level. Once the volume of fluid is restored to a predetermined safe level, the switch automatically resets to an open position to permit normal operation of device.

20 Claims, 5 Drawing Sheets

FLUID LEVEL SENSING SWITCH

BACKGROUND OF THE INVENTION

The present invention generally relates to an electrical switch which includes a fluid level sensor, and more particularly to a switch that is adapted to automatically complete an electrical circuit when the volume of fluid being monitored is below a predetermined level.

In many devices that house fluids within a reservoir, it is desirable to monitor the fluid level. In certain devices it may be advantageous to change an operating parameter when the volume of fluid falls below a predetermined level. For instance, it would be desirable to automatically shut off an internal combustion engine if the level of lubricating oil in the engine crankcase becomes inadequate. It also would be desirable to shut off a pump such as that used in a bilge of a boat, once the water level is sufficiently reduced. Likewise, it would be desirable to provide a low fluid level warning to users of consumable fluid products stored in tanks, such as home heating oil.

Problems associated with ignoring low fluid conditions vary from matters of inconvenience, to safety, to major system damage. For instance, the result of a loss of oil or a low oil condition during the operation of relatively small spark ignition engines, such as those used in power generators or lawn mowers, are well known in the art and are described, in part, in U.S. Pat. No. 4,600,820. In general, if such engines experience operating conditions involving a rapid loss of oil, unintended extreme tilting of the engine, or simply insufficient maintenance, they may lack access to a sufficient supply of oil to adequately lubricate the internal components of the engine. Continued operation of an engine experiencing such a condition may lead to severe engine damage and could present a safety hazard.

The switch used with spark ignition engines that is disclosed in the aforementioned U.S. patent, exhibits certain disadvantages that are overcome by the present invention. In particular, the prior art device is designed to shut off an engine by grounding the ignition system in the event of a low oil level. The switch is mounted horizontally, through a side wall of an engine crankcase. Hence, the device is likely to be overly sensitive to engine tilting because the device will likely be mounted closely adjacent a side wall of the crankcase. Also, the entire switch assembly, including its balance beam float assembly and switching lever, are contained within a horizontal encapsulating shield having slots and holes. The slots and holes permit communication with the oil in the crankcase and the escape of foam and bubbles in the oil.

The horizontal mounting of the prior art assembly in an engine crankcase, and its need to be located in the vicinity of the top surface of the oil when the oil level is at a predetermined maximum recommended level, also subject the device to considerable turbulence and fluctuations in the oil due to splashing and aeration generated by the use of a common crankshaft mounted splasher device. These conditions may result in less reliable performance of the switch, and may lead to intermittent operation of the ignition system. In addition, the balance beam assembly utilized in the prior art device does not appear well suited to cope with more violent and higher amplitude vibrations, such as those encountered once the ignition has been interrupted in a spark ignition engine. Similar disadvantages would be experienced if the prior art device is used to automatically shut off a diesel engine by interrupting an electronically controlled fuel supply system under low oil level conditions.

Additional prior art designs used for low fluid level conditions, such as in automatic engine shut off applications, include a glass reed switch with a floating magnet. One problem with this technology is that the pair of glass reeds in such a switch are very thin and tend to become welded together if too much electrical current is applied to the switch. In the case of an ignition cut off switch which is designed to ground the ignition system of a relatively small spark ignition engine under low oil level conditions, the reeds may become permanently joined due to a current that may be in a range as low as approximately 2 to 5 amps. In the event of such a switch failure, even after adding oil to reach a safe level, the ignition system will remain grounded and the engine will not be able to be restarted until the switch is replaced.

Some manufacturers using glass reed switches have added electrical devices such as a Triac to accommodate the operating amperages. Such additional components add significantly to the cost of the switch, yet do not alleviate other problems with glass reed switches, such as sensitivity to high temperature and shock.

In light of the shortcomings of the above-mentioned exemplary prior art devices, it is desirable to have a switch which combines fluid level sensing and automatic opening and closing of an electrical circuit, and which permits an improved mounting position to reduce sensitivity to fluid reservoir tilting. It is further advantageous to provide a switch device that is less sensitive to turbulence and fluctuations in fluid level that are present in some operating environments, such as splashing and aeration. It also is advantageous that a fluid level sensing switch have rotational torque characteristics that are less susceptible to intermittent operation during large amplitude, varied and lower frequency movements, such as the vibrations commonly experienced during shut down of an internal combustion engine. The present invention overcomes the disadvantages of the prior art, while providing the above mentioned desirable features of a fluid level sensing switch.

SUMMARY OF THE INVENTION

The present invention is generally embodied in an improved fluid level sensing switch. The switch comprises a base, a float pivotally connected to the base, a counterweight pivotally connected to the base, a linkage connecting the float and the counterweight, a conductive damper, an electrical terminal and a conductive pin.

When the volume of fluid is at or above a predetermined sufficient level, the switch remains open. If the volume of fluid falls below the predetermined sufficient level, then the float pivots downward, forcing the counterweight into the conductive damper, which in turn contacts the terminal. In this condition, the switch is closed and completes the circuit.

In another aspect of the invention, the counterweight is formed of a material that is of greater density than the material of the float.

In still another aspect of the invention, the conductive damper, conductive pin and terminal may be of sufficient physical size to enable them to carry sufficient amperage reliably, so as not to require additional electronic devices, such as a Triac, to accommodate the operating amperage in the circuit. Indeed, the invention lends itself to use of components tailored to specific needs, and can be structured to carry relatively low amperages, or current in excess of 60 amps.

In a further aspect of the invention, the electrical terminal includes a magnet. The magnet provides a hysteresis effect to prevent unintended intermittent opening and closing of the switch, such as during the more violent vibrations encountered in shutting off an engine. The magnet helps maintain contact between the conductive damper and the terminal, thus keeping the switch closed, for instance to ground an engine ignition system, until a sufficient fluid level raises the float. As the float is raised by an increase in fluid level, the linked counterweight pivots which, in turn, forces the conductive damper to break its magnetic coupling to the terminal, opening the switch.

In another aspect of the invention, the switch. has a cover attached to the base.

In still another aspect of the invention, the cover is adapted to be snap fit over the base.

In a further aspect of the invention, the cover has at least one opening arranged at or near its top, and at least one opening, such as a hole or slot near its bottom. The upper opening or openings allow air to pass out of the fluid that is within the cover, while the lower opening or openings permit fluid near the bottom of the reservoir in which the switch is housed to enter and exit the device through the cover. Communication with fluid that is very low in the reservoir reduces the sensitivity of the switch to conditions that involve turbulence, splashing or aeration, because the switch is protected by the cover, and because fluid near the bottom of the reservoir is less likely to be turbulent or to contain air bubbles or foam.

In a further aspect of the invention, the base of the switch is adapted to be mounted vertically, to extend upward from the bottom of a reservoir. Therefore, sensitivity to tilting of a reservoir can be reduced by mounting the switch very close to the center of the reservoir, where the fluid level will generally be most stable. Moreover, in a particularly advantageous aspect of the invention, the switch may be adapted to be mounted through the bottom wall of a reservoir. This mounting configuration would permit convenient withdrawal of the switch from the bottom of the reservoir for service or replacement.

In yet a further aspect of the invention, the switch uses a four bar linkage to generate sufficient torque to operate the float and counterweight, and to overcome wet film sticking between components. The four bar linkage further permits a very compact switch structure. The switch enjoys damping a wide range of vibration amplitudes and frequencies due to the enhanced torque management characteristics obtained by use of a float and a counterweight that are each separately pivotally mounted and that are connected via a linkage, in further conjunction with a low mass conductive damper.

It is to be understood that both the foregoing general description and the following detailed description of a preferred embodiment of the present invention in the form of a low oil level ignition cut off switch are exemplary, provided for purposes of explanation only, and are not restrictive of the invention as claimed.

BRIEF DESCRIPTION OF THE DRAWINGS

The drawings depict a fluid level sensing switch of the present invention in the form of a low oil level ignition cut off switch for a spark ignition engine. In describing the preferred embodiment, reference is made to the accompanying drawings wherein like parts have like reference numerals, and wherein.

Figure 1:
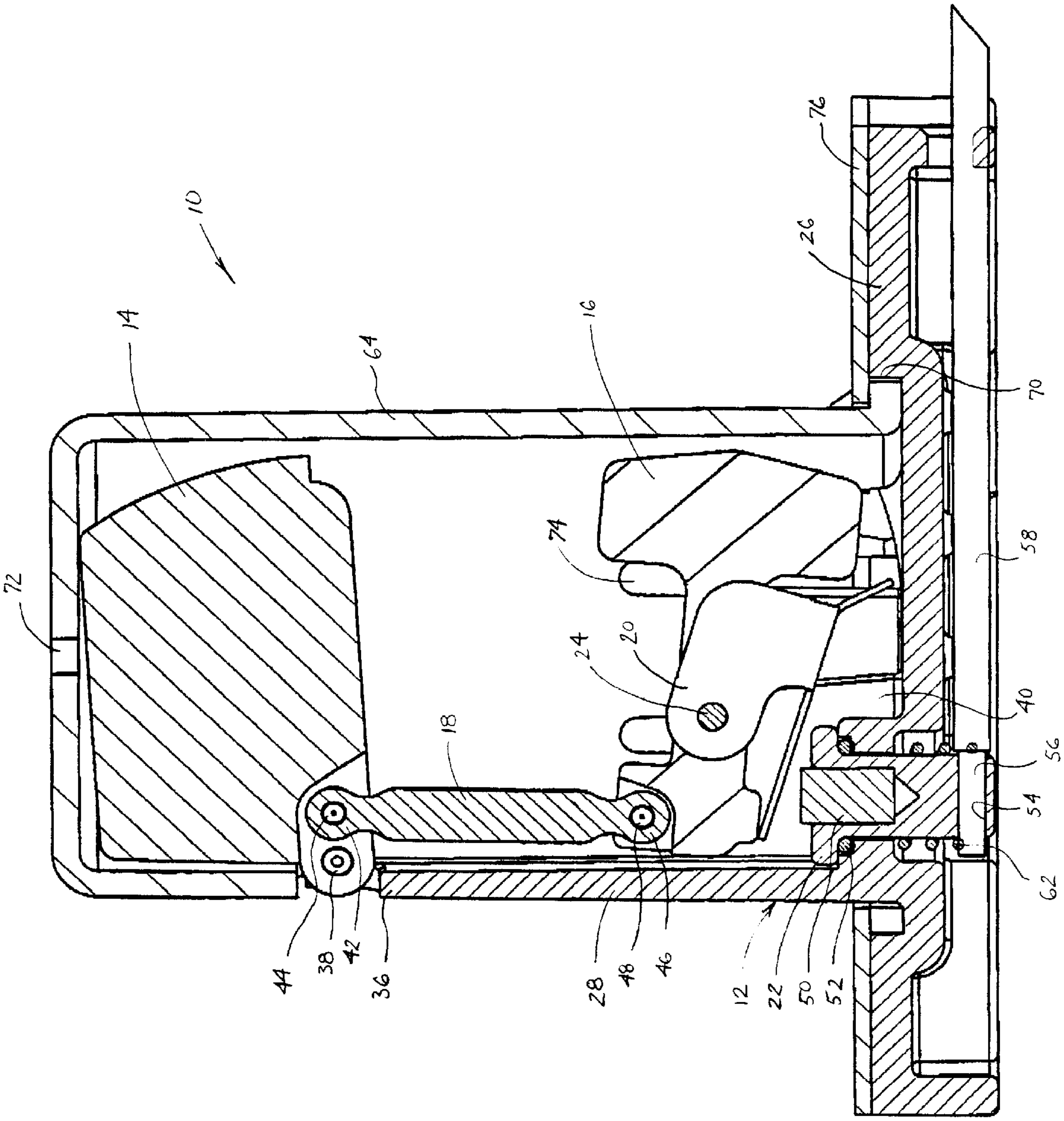
FIG. 1 is a side cross section view of a preferred embodiment of fluid level sensing switch in accordance with the present invention, except with a conductive damper shown in side view. The switch is shown in the open position, with the float in its highest position.

It should be understood that the drawings are not to scale and that certain aspects may be illustrated in phantom views. While considerable mechanical details of a fluid level sensing switch, including details of fastening means and other plan and section views of the preferred embodiment, depicting the invention in the form of a low oil level cut off switch, have been omitted, such detail is not per se part of the present invention and is considered well within the comprehension of those skilled in the art in light of the present disclosure. It should also be understood that the present invention is not limited to the preferred embodiment illustrated.

DETAILED DESCRIPTION OF THE PREFERRED EMBODIMENT

Referring to the above discussion it will be appreciated that the present invention generally may be embodied in numerous configurations of a fluid level sensing switch that is adapted to automatically complete an electrical circuit when the volume of fluid being monitored is below a predetermined level. Referring to FIGS. 1–5, a preferred embodiment of the present invention is shown as it is generally embodied in a low oil level cut off switch. The fluid level sensing switch 10 includes a base 12, a float 14 pivotally connected to the base 12, a counterweight 16 pivotally connected to the base 12, and a linkage 18 connecting the float 14 and the counterweight 16. The switch 10 further includes a conductive damper 20, an electrical terminal 22 and a conductive pin 24.

The material requirements for components of the fluid level sensing switch will depend upon the particular switch structure and its anticipated operating environment. In an operating environment such as that which could be expected for this exemplary embodiment of a low oil level ignition cut off switch, the base 12 would be required to be rigid and to withstand a significant range of temperature, such as from approximately −40° C. to 177° C., as well as vibrations up to approximately 30 g's. The base 12 would also be required to be resistant to body impact, as well as submersion in petroleum products, such as lubricants or fuels, and solvent sprays, such as are commonly used in degreasing. Accordingly, the base 12 of this exemplary embodiment would preferably be formed of a plastic, such as of the Nylon 6-6® type, or of other suitable materials, such as PPA, PCT, PEI, or PEK.

Figure 3:
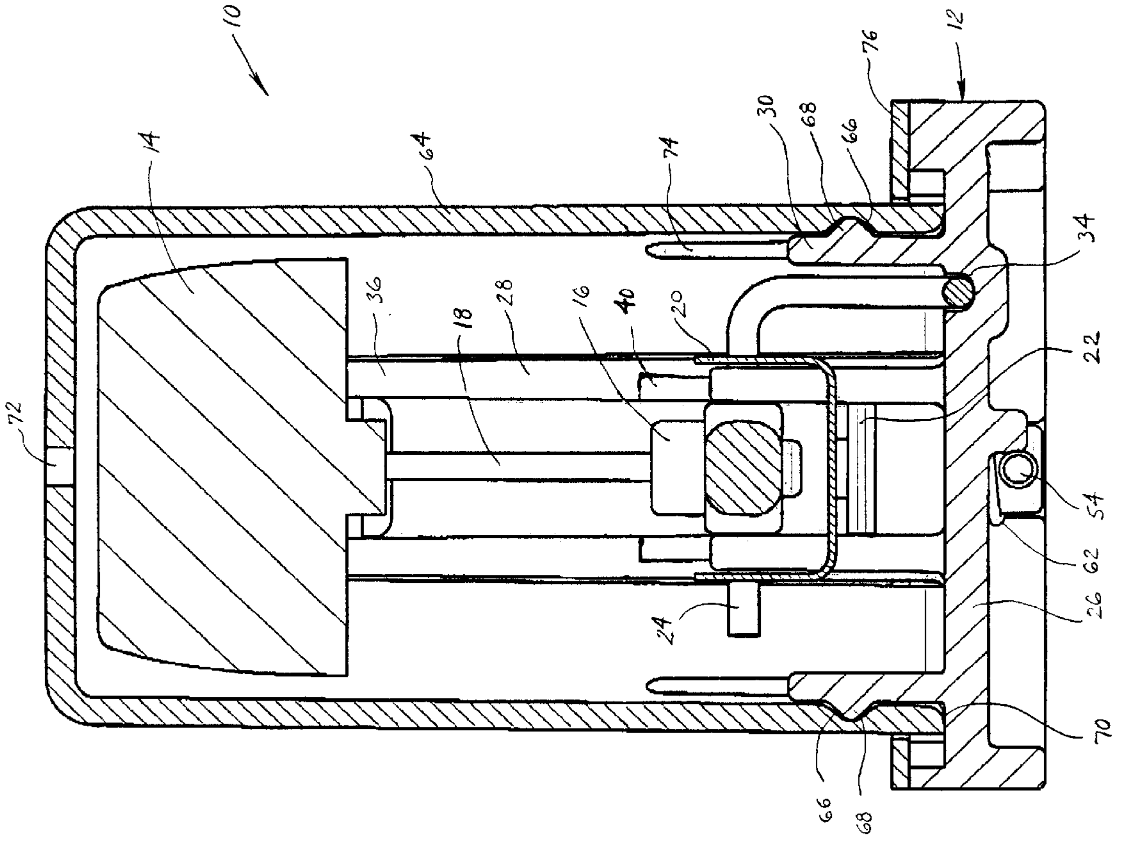
FIG. 3 is an end cross section view of the preferred embodiment through the center of the device. The switch is shown in the closed position, but with the float shown in an intermediate position.
Figure 4:
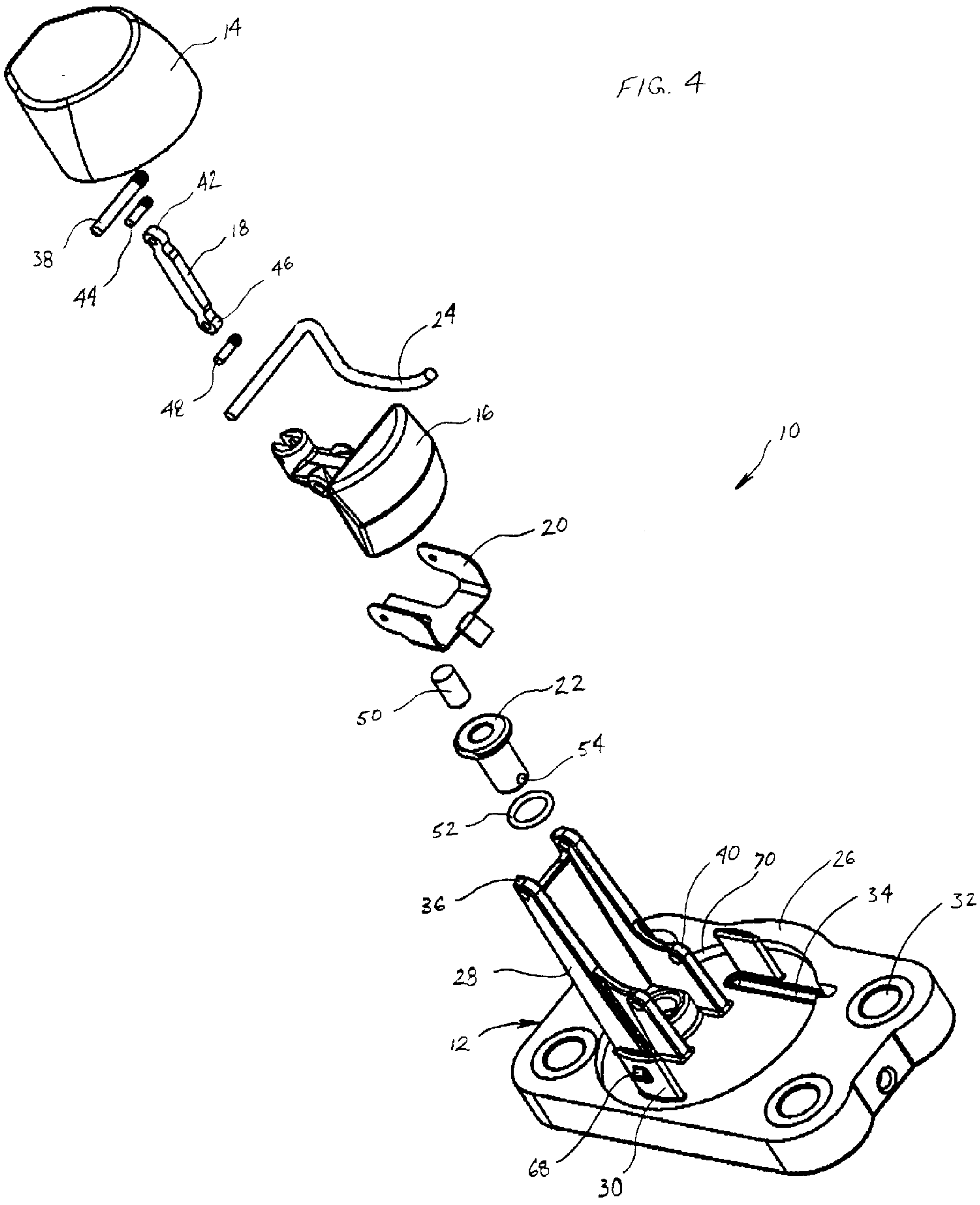
FIG. 4 is an exploded view of the preferred embodiment, without the cover, mounting gasket and compression limiters, and terminal connecting spring and wire.
Figure 5:
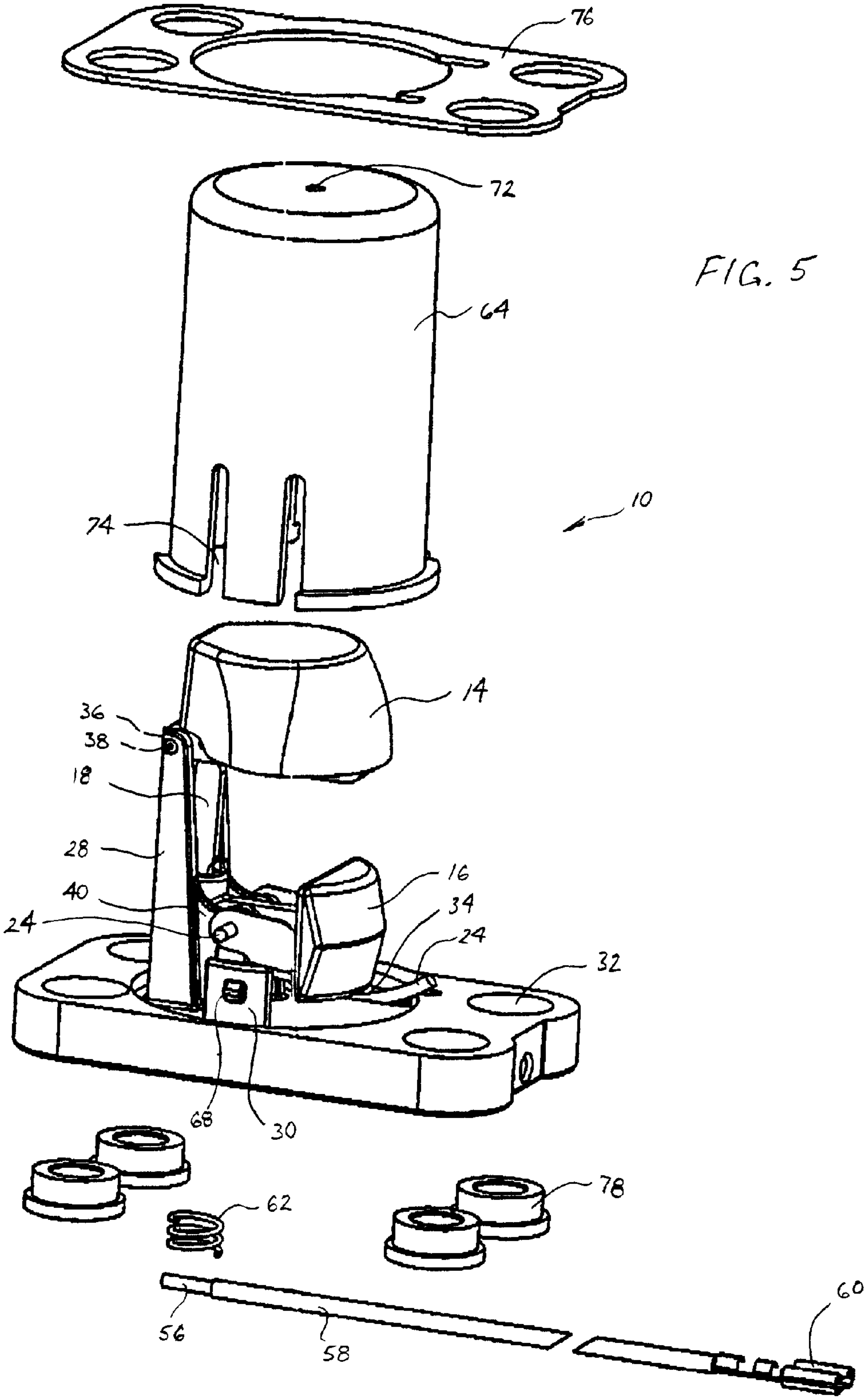
FIG. 5 is a perspective view of the assembled components of FIG. 4, further showing the cover, mounting gasket and compression limiters and terminal connecting spring and wire in an exploded view.

The base 12 of the preferred embodiment includes a generally horizontal portion 26 and an upstanding, two-tiered pedestal portion 28. Referring to FIGS. 3–5, the base 12 also may incorporate upstanding tab portions 30 to provide fastening means. The base 12 further includes mounting holes 32 and a slot 34 for conductive pin 24. As shown in FIG. 5, pin 24 preferably projects upward from the base 12. Thus, when switch 10 is installed on the outer bottom wall of an electrically conductive engine crankcase (not shown), the conductive pin 24 will contact the crankcase and accordingly be capable of sinking a sufficient amount of current and voltage to ground the ignition system and stop the engine without damage to the switch.

Figure 2:
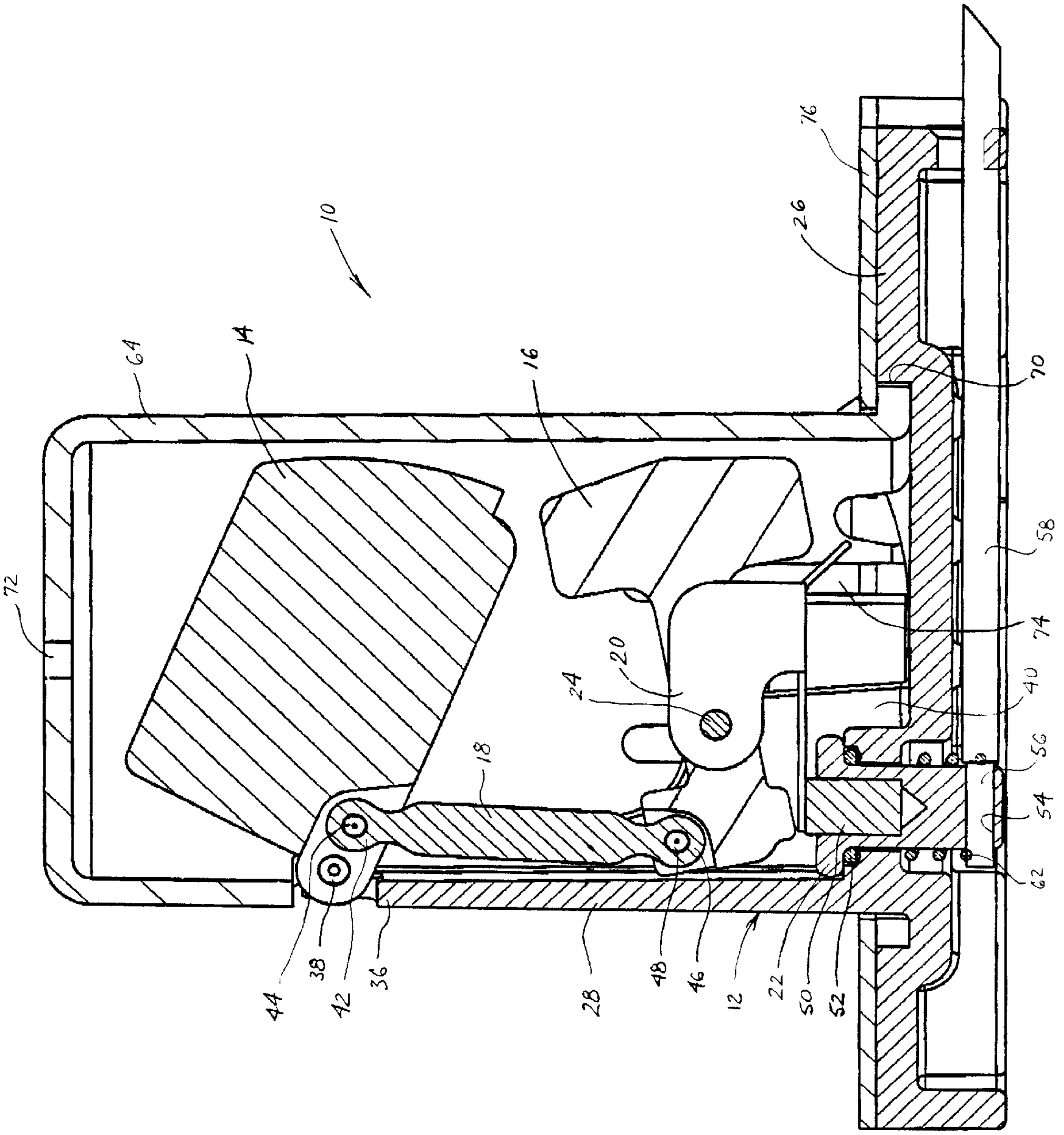
FIG. 2 is a side cross section view of the preferred embodiment similar that shown in FIG. 1, but with the switch shown in the closed position, and the float in its lowest position.

As is best shown in FIGS. 1, 2 and 4, the float 14 is preferably pivotally mounted at its rear to the base 12 proximate the upper tier 36 of the pedestal portion 28, via press fit pin 38. The counterweight 16 and conductive damper 20 are both preferably pivotally mounted along their respective lengths to the base 12 proximate the lower tier 40 of the pedestal portion 28, via conductive pin 24, although one will appreciate that they may utilize separate pivot axes. The linkage 18 is pivotally connected at a first end 42 to the float 14 forward of pin 38, via press fit pin 44. The linkage 18 is further pivotally connected at a second end 46 to the counterweight 16 at its rear, via press fit pin 48. While press fit pins, preferably made of 1010 cold rolled steel, are employed in the exemplary embodiment, one skilled in the art will appreciate that other fasteners and structures for pivoting may be employed, as well as alternative suitable materials.

The float 14 is preferably solid, has a density greater than the fluid, and has similar material requirements to the base 12. Despite having a density greater than the fluid in which the float 14 is located, the float 14 experiences two forces which tend to provide lift. First, the buoyant force produced by the volume of the fluid that is displaced by the float 14 itself. Second, the counterweight 16 is configured to preferably bias the rear of the counterweight 16 upward to assist in forcing the float 14 to pivot upward through linkage 18. The bias of the counterweight 16 and a similar configured bias of the conductive damper 20 tend to cause the two to pivot away from the terminal 22 at the rear, holding the switch 10 in the open position. The material of counterweight 16 of the preferred embodiment has a density greater than the material of float 14, but otherwise has similar environmental requirements. Accordingly, the counterweight 16 of the switch 10 may be constructed of a material such as Zamac®, a pot metal, sintered powdered metal, or any other suitable alternative material.

The damper 20 is rigid, of low overall mass, and has similar environmental requirements to those of float 14 and counterweight 16. It may be constructed of suitable conductive material, such as 1010 cold rolled steel. The conductive damper 20 pivots on conductive pin 24, which is made of suitable electrically conductive material, such as spring steel. The terminal 22 also is made of a suitable electrically conductive material, such as 1010 cold rolled steel, and is fitted within the base 12. Terminal 22 further houses a press fit magnetic insert 50 which may be made of Alnico®, or other suitable magnetic material. This construction allows the damper 20 to be attracted to the magnetically charged terminal 22. Thus, if switch 10 experiences a closed position, the damper 20 is adapted to remain in magnetic contact with the terminal 22 until the float 14 pivots upward and the forward end of the counterweight 16 rotates downward, contacting the damper 20 at its end opposite and forcing it to break the magnetic bond to the terminal 22. The low mass of damper 20 reduces the likelihood that damper 20 will become magnetically decoupled from terminal 22 due to the vibration experienced during engine shut down.

In this embodiment, a seal 52, such as of the Viton® rubber O-ring type, is used to seal the terminal 22 to the base 12. The terminal 22 further has a hole 54 therethrough to accept a first end 56 of a wire 58 which is to be connected at its second end 60 to the low voltage side of an engine's spark ignition coil (not shown). A spring 62 is used to hold the wire 58 in conductive engagement with the terminal 22, which also serves to hold the terminal 22 within the base 12. The spring 62 is preferably constructed of suitable material, such as spring steel.

It is preferable that the switch of the present invention include a protective cover 64 attached to the base 12. The cover 64 of the preferred embodiment has material requirements similar to those of float 14, and may be constructed of like material. In the preferred embodiment, as shown in FIG. 3, the cover 64 has opposed recesses 66 in its inner wall, which engage locking detents 68 on tab portions 30, so as to hold the cover 64 within a groove 70 of the base 12.

The cover 64 has at least one opening 72 arranged at or near its top. The upper opening 72 of the preferred embodiment allows air to pass out of the oil that is within the cover 64. The cover 64 further has at least one opening, such as a hole or slot 74 near its bottom. The lower opening or openings 74 permit oil near the bottom of the crankcase to enter and exit the device through the cover 64. Communication with oil that is very low in the crankcase reduces the sensitivity of the switch 10 to turbulence, splashing and aeration, because the switch 10 is protected by the cover, and because oil near the bottom of the crankcase is less likely to be turbulent or to contain air bubbles or foam. Also, the openings 72 and 74 may be relatively small to help limit the exposure of the switch 10 to metal shavings which may contaminate the oil.

Referring to FIG. 5, to seal the switch 10 to the bottom of an engine (not shown), the preferred embodiment employs a gasket 76, such as of common compressed paper or other suitable type. The switch 10 further may use compression limiters 78, preferably constructed of aluminum or other suitable material, to prevent crushing of the non conductive base 12 when installing the switch 10 to the engine with fasteners such as bolts (not shown).

In operation, as shown in FIG. 1, if the fluid level in the reservoir is at or above a predetermined minimum level, the float 14 will achieve its upward most pivotal position, while the end of counterweight 16 which is forward and of greater mass will achieve its lowest position. In such coordinated positions, the counterweight 16 will not permit the electrically conductive damper 20 to contact terminal 22. Rather, conductive damper 20 will rotate to a position leaving the switch 10 in an open position.

If the fluid level is reduced to a point below a predetermined minimum safe operating level, then as seen in FIG. 2, the float 14 will pivot downward, driving the rear end of the counterweight 16 into the conductive damper 20 and, in turn forcing the damper 20 to achieve a magnetic coupling to terminal 22. When this occurs in the exemplary embodiment, the ignition system of the engine is linked through the switch 10, with its conductive pin 24, to the electrically conductive engine crankcase. This closing of the switch 10 and resulting closing of the ground circuit, causes the ignition system to ground out, shutting off the engine.

Once the engine has reached a low oil condition and experience automatic shut off via the fluid level sensing switch 10, the conductive damper 20 will remain magnetically coupled to terminal 22 until the fluid level in the crankcase is increased sufficiently to raise the float 14. In this instance, the counterweight 16 will be forced to pivot about the conductive pin 24, driving its forward end downward. As the forward end of the counterweight 16 moves downward, it contacts the forward end of the damper 20, forcing the damper 20 to pull away from its magnetic coupling to terminal 22. When the damper 20 is decoupled from terminal 22, the switch 10 is open. With the switch 10 in the open position, the ground circuit is open, permitting normal operation of the engine ignition system.

It will be apparent to those skilled in the art that various modifications and variations can be made in the design and construction of a fluid level sensing switch without departing from the scope or spirit of the invention. It also should be understood that any of a variety of fastening means and suitable materials of construction and dimensions may be used to satisfy the particular needs and requirements of the end user. Other embodiments of the invention will be apparent to those skilled in the art from consideration of the specification and practice of the invention disclosed herein.

What is claimed is:

1. A fluid level sensing switch comprising:

a base;

a float pivotally connected to the base;

a counterweight pivotally connected to the base;

a linkage pivotally connected to the float at a first end and pivotally connected to the counterweight at a second end;

an electrically conductive damper pivotally connected to the base;

an electrically conductive terminal connected to the base; and an electrically conductive pin connected to the conductive damper and the base.

2. A fluid level sensing switch in accordance with claim 1, wherein said conductive damper is pivotally connected to the conductive pin.

3. A fluid level sensing switch in accordance with claim 2, wherein said counterweight is pivotally connected to the conductive pin.

4. A fluid level sensing switch in accordance with claim 1, wherein said conductive damper is of lower mass than said counterweight.

5. A fluid level sensing switch in accordance with claim 1, wherein said float is made of a material that is of greater density than the fluid in which said float is intended to be used.

6. A fluid level sensing switch in accordance with claim 1, wherein said counterweight is made of a material that is of greater density than the material of which the float is made.

7. A fluid level sensing switch in accordance with claim 1, wherein said conductive damper, terminal and pin are of sufficient size to carry a current greater than 5 amps.

8. A fluid level sensing switch in accordance with claim 1, further comprising a cover having at least one opening.

9. A fluid level sensing switch in accordance with claim 8, wherein said cover further comprises at least one upper opening and at least one lower opening.

10. A fluid level sensing switch in accordance with claim 1, wherein said electrically conductive terminal further comprises a magnet.

11. A fluid level sensing switch in accordance with claim 1, wherein said switch is adapted for mounting to the bottom wall of a reservoir.

12. A fluid level sensing switch in accordance with claim 11, wherein said switch is adapted for mounting through a bottom wall of a reservoir.

13. A fluid level sensing switch in accordance with claim 1, wherein said switch further comprises a wire connected to said conductive terminal and a spring, wherein the spring and wire are adapted to retain the electrically conductive terminal in the base.

14. A fluid level sensing switch in accordance with claim 1, wherein said conductive terminal of said switch is electrically connected to the ignition system of an engine and the conductive damper is electrically connected to an electrically conductive engine crankcase.

15. A fluid level sensing switch in accordance with claim 14, further comprising a wire connected at a first end. to said terminal and at a second end to an ignition system coil.

16. A fluid level sensing switch in accordance with claim 1, wherein said switch is adapted for use in monitoring the volume of lubricating fluid in a crankcase of a spark ignition engine and is further adapted to automatically ground the ignition system in said engine if the volume of fluid falls below a predetermined level.

17. A fluid level sensing switch in accordance with claim 1, wherein said switch is adapted for use in monitoring the volume of lubricating fluid in a crankcase of a diesel engine and is further adapted to be used to automatically interrupt fuel delivery in said engine if the volume of fluid falls below a predetermined level.

18. A method of providing a fluid level sensing switch for use in monitoring a volume of fluid in a reservoir and for automatically opening and closing a circuit in accordance with predetermined fluid levels in the reservoir, the method comprising:

installing in an electrically conductive reservoir a fluid level sensing switch having a base, a float pivotally connected to the base, a counterweight pivotally connected to the base, a linkage pivotally connected to the float at a first end and pivotally connected to the counterweight at a second end, an electrically conductive damper pivotally connected to the base, an electrically conductive terminal, and an electrically conductive pin connected to the conductive damper and the base and in contact with the reservoir; and connecting the electrically conductive terminal to said circuit.

19. A method of providing a fluid level sensing switch in accordance with claim 18, wherein the switch further comprises a wire to connect the electrically conductive terminal to said circuit, and a spring to connect the wire to the terminal.

20. A method of providing a fluid level sensing switch in accordance with claim 19 wherein the spring and wire are adapted to retain the electrically conductive terminal in the base.

* * * * *